Figure 1:
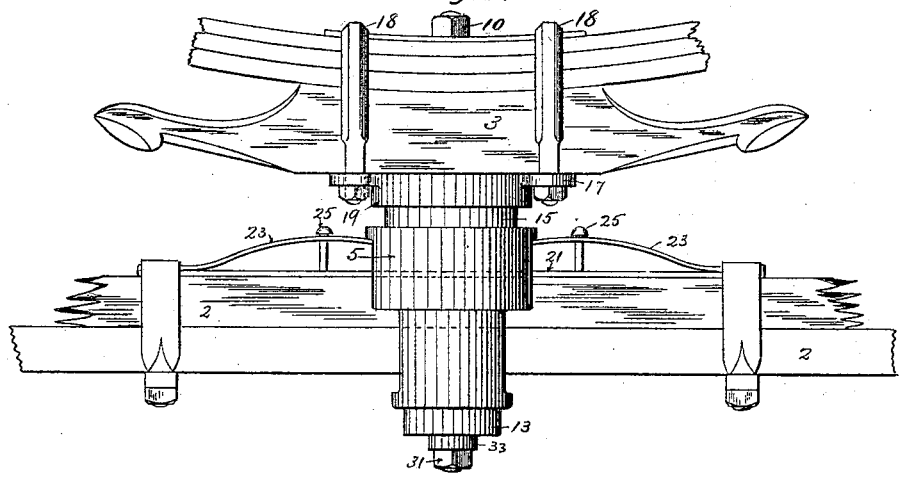

(No Model.) 2 Sheets—Sheet 1.

J. EDGAR.
FIFTH WHEEL.

No. 372,407. Patented Nov. 1, 1887.

Witnesses
A. M. Gaskell
R. H. Sanford

Inventor
John Edgar
By R. C. Paul atty (No Model.) 2 Sheets—Sheet 2.

J. EDGAR.
FIFTH WHEEL.

No. 372,407. Patented Nov. 1, 1887.

Witnesses
A. M. Gaskell
R. H. Sanford

Inventor
John Edgar
By A. C. Paul Atty

UNITED STATES PATENT OFFICE.

JOHN EDGAR, OF ROCHESTER, MINNESOTA.

FIFTH-WHEEL.

SPECIFICATION forming part of Letters Patent No. 372,407, dated November 1, 1887.

Application filed February 25, 1887. Serial No. 228,822. (No model.)

*To all whom it may concern:*

Be it known that I, JOHN EDGAR, of Rochester, in the county of Olmsted and State of Minnesota, have invented certain Improvements in Fifth-Wheels for Carriages, of which the following is a specification.

My invention relates to improvements in devices for pivoting the forward axle of a carriage to the body. These devices are generally denominated "fifth-wheels," and as usually constructed they have, besides a loose king-bolt which forms the pivot, a horizontal circle or plate, which forms a broad bearing upon which the parts turn. The main objections to this device are that when one of the forward wheels runs over uneven ground one end of the axle is thrown quickly upward, and violent shocks are given to the plate or plates at one side of the pivot, and they are thereby strained and often broken and the reaches of the carriage are twisted, and unless they are quite small and limber they will be often broken.

Another objection to the old form of fifth-wheel is that the disks or rims that form them cut and grind upon each other, and dirt and dust get between them, increasing the wear of the parts and making them turn very hard. Another objection to the common fifth-wheel is experienced in using them on large heavy wagons and omnibuses, from the fact that the rims of the bearing-circles, when heavily loaded, bind upon each other and will not render, the pole thus becoming set either to the right or left, and preventing the horses from guiding the vehicle.

The objects of my invention are to overcome these objections and provide a fifth-wheel that is small, compact, strong, and durable. I accomplish these results by providing a fixed vertical axle upon which the hub of the fifth-wheel (which is fixed to a part of the carriage-body) fits and is free to turn. This vertical axle forms a center of oscillation between the carriage-body and the forward part of the running-gear, and takes the place of the usual king-bolt. The fixed vertical axle is hung upon and supported by an axle that is fixed across the axle-tree of the carriage. The fixed vertical axle forms a hub for the fixed cross-axle, before referred to, and this hub and cross-axle form a horizontal center of oscillation between the axle-tree and the carriage-body.

The invention will be more fully understood from the following detailed description, taken in connection with the accompanying drawings, which form part of this specification, and in which—

Figure 2:
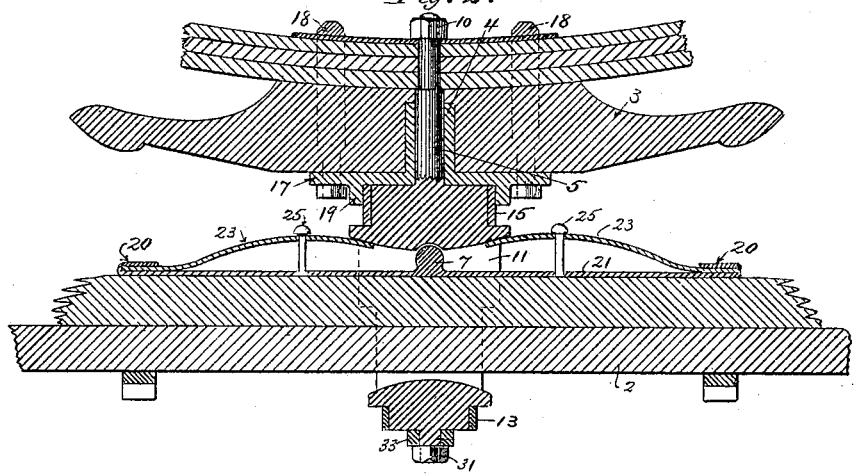
Figure 3:
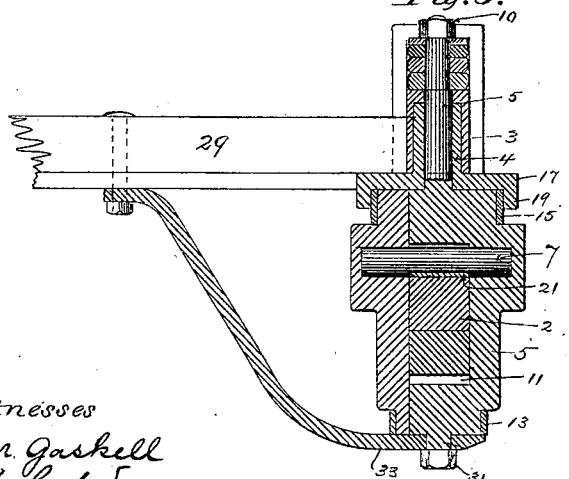
Figure 4:
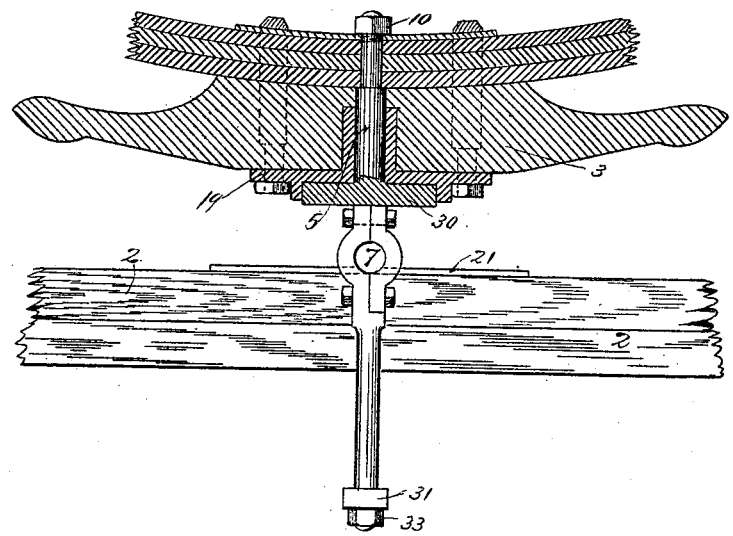
Figure 5:
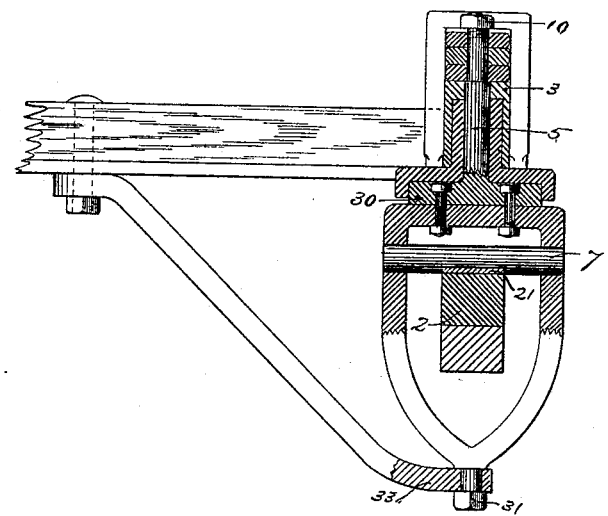

Figure 1 is a front elevation of a portion of an axle-tree and carriage-body with my improvement applied thereto. Fig. 2 is a central vertical section of the same. Fig. 3 is a vertical section at right angles to the plane of Fig. 2. Fig. 4 is a front elevation of a modified structure. Fig. 5 is a side elevation of the same.

In the drawings, 5 represents a fixed vertical axle, the upper portion of which receives the hub 4 of the fifth-wheel, which is placed in a vertical opening in the forward cross-tree, 3, of the carriage or wagon body. The hub 4 fits upon the fixed axle 5, which preferably extends through the hub and through the cross-tree, and the parts are locked together by means of a nut, 10, upon the upper end of the axle 5. The under surface of the cross-tree is provided with the bearing-plate 17, which is preferably formed integral with the hub 4. The hub 4 and the bearing-plate 17 are secured in place by means of suitable clips, 18, or other suitable devices.

The lower part of the axle is larger than the upper part, and upon the upper surface of this enlarged part the bearing-plate 17 rests. The fixed axle thus supports the superimposed weight of the forward part of the vehicle.

The fixed vertical axle is supported upon a cross-axle, 7, that is secured rigidly to the axle-tree 2. The vertical axle 5 thus forms a hub for the cross-axle 7. This connection between the vertical fixed axle 5 and the cross-axle 7 may be formed in any suitable manner. I prefer to provide the lower part of the axle with an opening, 11, extending through it, through which the axle-tree passes. At each side, front and rear, the axle 5 is provided with bearings for the ends of the cross-axle 7. The axle 7 may be secured to the axle-tree in any suitable manner. I prefer to secure it to the axle-tree by means of a plate, 21, and suitable clips, 20, as shown in Figs. 1 and 2. The axle 7 may be welded to the plate 21 or formed integral therewith.

Springs 23 are preferably secured to the axle-tree at each side of the center and project into the opening 11 in the vertical axle 5, their free ends bearing against the upper walls of the opening. Pins 25 pass through these springs and into the plate 21 and keep the springs in position. As the springs bear equally upon the axle 5 at opposite sides of the axle 7, they tend to keep the carriage-body level at all times. The springs are not, however, essential to the practical working of the device, and I do not confine myself thereto.

The enlarged portion of the vertical axle is preferably formed in two vertical sections, as shown in Fig. 3, for convenience in attaching or detaching the parts. These sections are secured together by rings 13 and 15 at the lower and upper portions thereof. The lower end of the axle is preferably provided with a nut, 31, which secures to it the forward end of the brace 33 on the reach 29.

In some instances the vertical axle 5 may be formed as shown in Figs. 4 and 5, having an open eye in its lower portion, through which the axle-tree passes. This eye is provided with bearings or boxes, in which the cross-axle is hung, and at its upper end has bolted or riveted to it a plate, 30, that forms the base of the fifth-wheel. The bearing-plate 17 is provided with a flange, 19, that covers the edge of the plate or surface upon which the plate 17 rests, and excludes dirt and dust therefrom.

It will be seen that I have simplified the construction of fifth-wheels very largely, that when one end of the axle-tree is thrown quickly upward or dropped down there will be no violent shock to the carriage-body, owing to the use of the cross-axle 7, which forms a horizontal center of oscillation about which the axle-tree has a vertical oscillatory movement, and that the perfectly free movement of the parts over each other prevents any binding or cutting of the bearing-plates, and that the joint thus formed is very strong and compact.

The parts constituting my device may be manufactured and put upon the market separately, to be applied to any carriage by the user thereof.

I claim as my invention—

1. The combination, in a carriage or wagon, of a hub, as 4, secured to the forward cross-tree, 3, a fixed vertical axle, 5, the cross-axle 7, secured upon the axle-tree 2 and supporting said vertical axle, and the springs 23, secured to the axle-tree and bearing upon opposite sides of the vertical axle, all substantially as described.

2. The combination, in a carriage or wagon, of the axle-tree, a cross axle or spindle secured rigidly thereon, a standard or support pivotally supported upon said cross-axle and provided with a fixed vertical spindle, 5, secured rigidly to said support, substantially as described.

3. The combination, with the axle tree 2, provided with the cross-spindle 7, of the support or standard 9, pivotally supported upon said cross-spindle and provided with an opening through which said axle-tree 2 passes, and with the fixed vertical spindle 5, substantially as described.

In testimony whereof I have hereunto set my hand this 17th day of February, 1887.

JOHN EDGAR.

In presence of—
ARTHUR L. GORE,
C. J. PORTER.